June 12, 1951     G. D. STOUGH ET AL     2,556,302
CROSSBAR STRUCTURE
Filed June 24, 1946     3 Sheets-Sheet 1
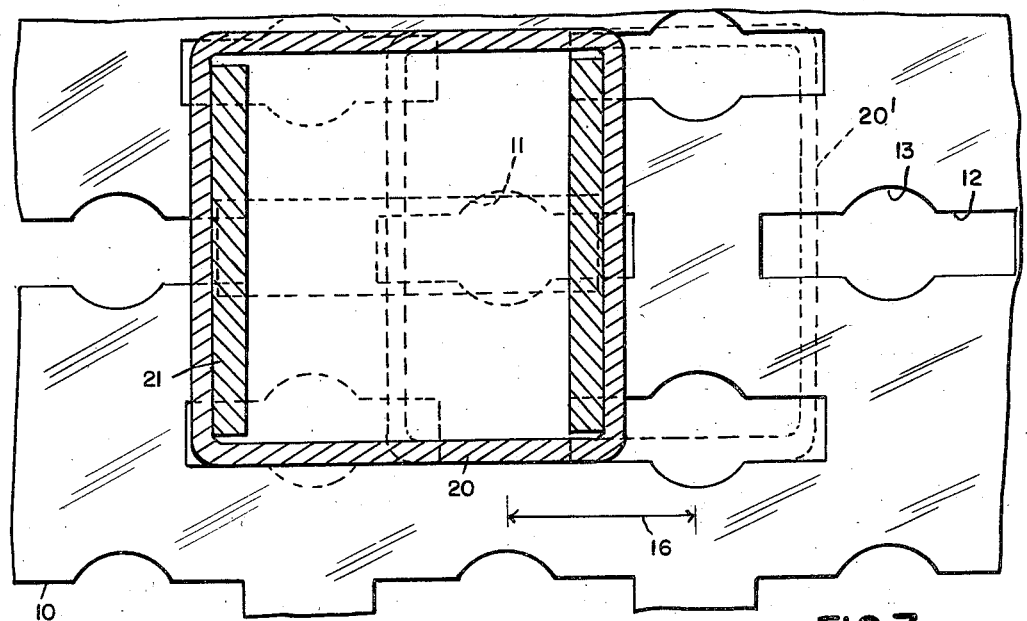
FIG.7.
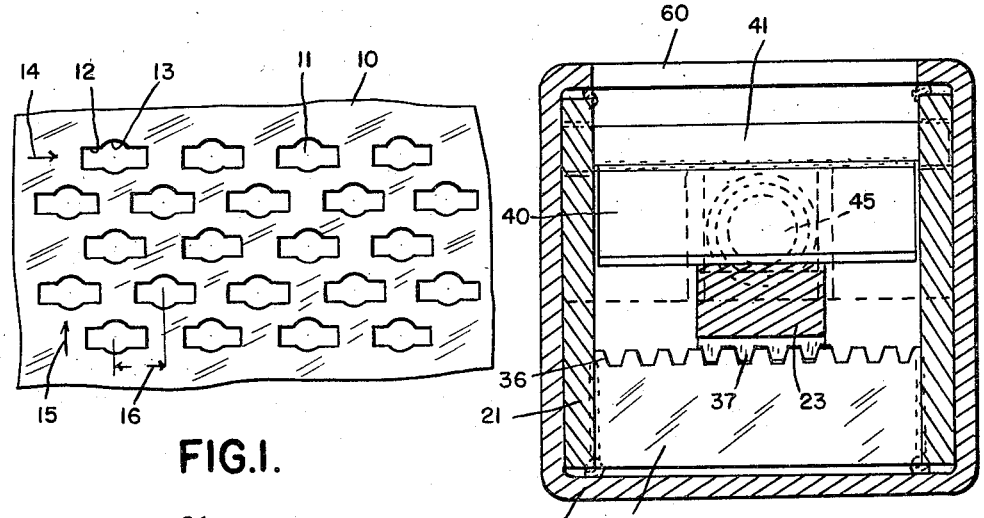
FIG.1.
FIG.4.
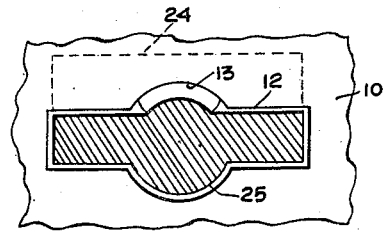
FIG.9.
INVENTORS
GERALD D. STOUGH
RICHARD W. FOX
BY Whittemore, Hulbert & Belknap
ATTORNEYS June 12, 1951     G. D. STOUGH ET AL     2,556,302
CROSSBAR STRUCTURE
Filed June 24, 1946     3 Sheets-Sheet 2

INVENTORS
GERALD D. STOUGH
BY RICHARD W. FOX
ATTORNEYS

June 12, 1951  G. D. STOUGH ET AL  2,556,302
CROSSBAR STRUCTURE
Filed June 24, 1946  3 Sheets-Sheet 3
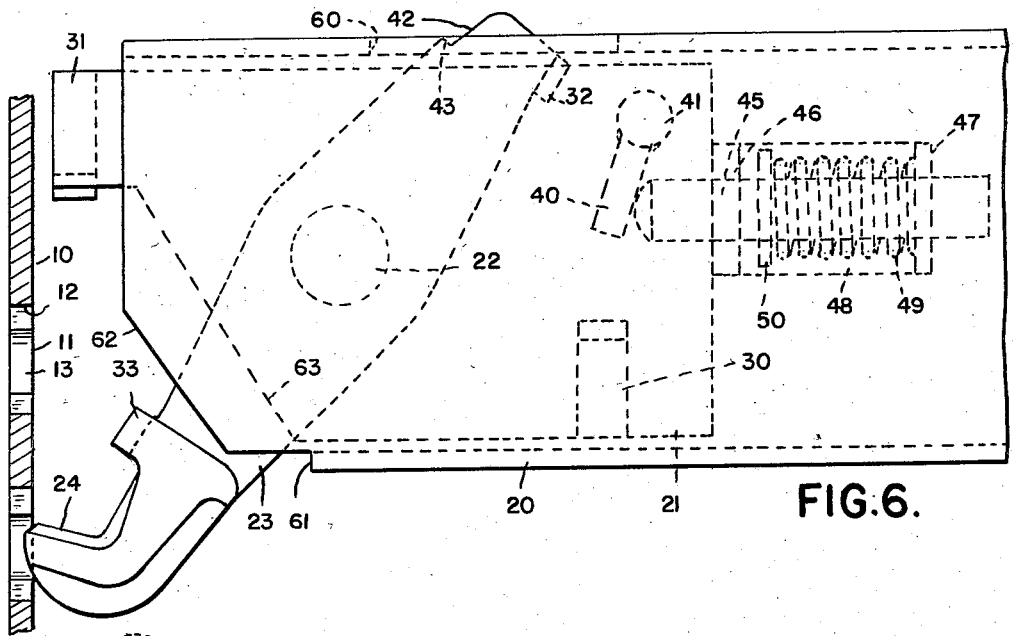
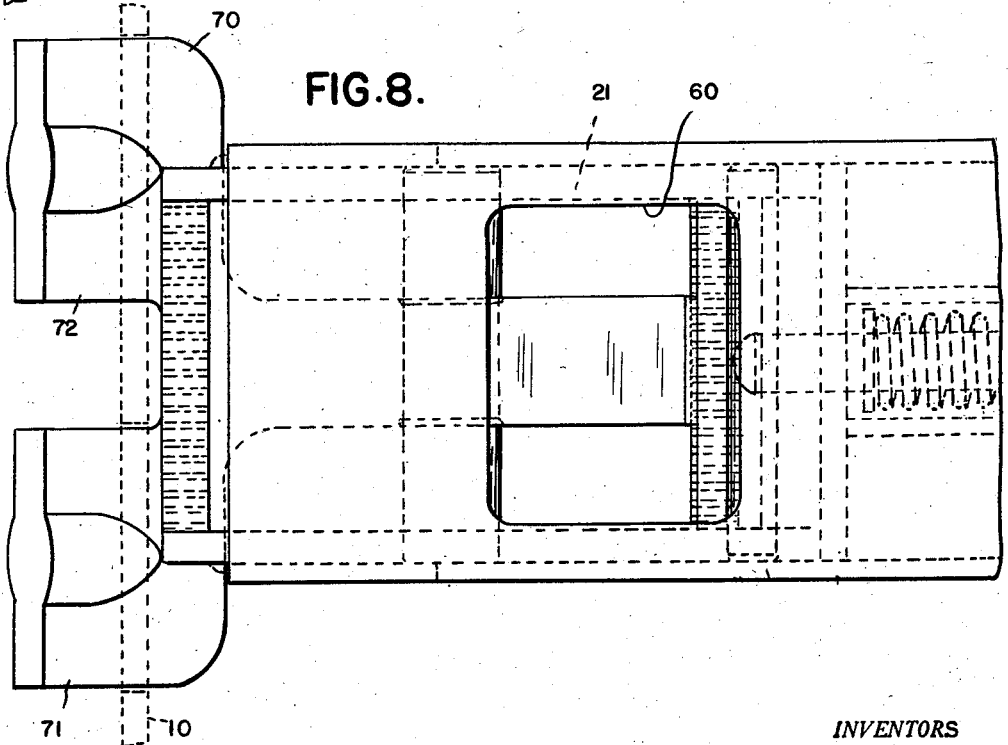
INVENTORS
GERALD D. STOUGH
BY RICHARD W. FOX
ATTORNEYS Patented June 12, 1951

2,556,302

UNITED STATES PATENT OFFICE 2,556,302

CROSSBAR STRUCTURE

Gerald D. Stough, Detroit, and Richard W. Fox, Pleasant Ridge, Mich., assignors to Whitehead & Kales Company, River Rouge, Mich., a corporation of Michigan Application June 24, 1946, Serial No. 679,026

33 Claims. (Cl. 105—369)

The present invention relates to crossbar structure and more particularly to a crossbar or cargo brace designed for use in connection with cargo stowage.

In the past, cargo stowage spaces have been provided with confronting walls having a plurality of crossbar receiving openings therein, these openings being arranged in closely spaced horizontal and vertical rows. Crossbars have been arranged with means at their ends adapted to enter into and be rigidly supported by opposed pairs of openings.

Crossbars of this type have been widely used in freight cars and may be used equally well in motor vans, cargo planes and the like.

Briefly described, the crossbar structure which forms the subject matter of the present invention comprises an elongated bar having secured adjacent its ends movable supporting elements which in the preferred form of the invention are hook-shaped levers pivoted intermediate their ends adjacent the ends of the crossbar. These hook-shaped supporting elements have a cross sectional shape corresponding to the shape of the openings provided in the side walls of the cargo stowage space. They are adapted to be swung between a supporting position in which they extend substantially horizontally beyond the end of the crossbar and a retracted position in which they do not extend beyond the end of the crossbar. These supporting elements are transversely adjustable with respect to the crossbar by an amount substantially equal to the spacing between vertical rows of openings in the side walls so that the crossbars may occupy any desired position longitudinally of the cargo stowage space. Abutment means are provided for engagement by the supporting elements when they are in supporting position so that the weight of the crossbar or any structure supported thereby is sustained by the abutments referred to rather than by the pivot pins which carry the supporting elements.

With the foregoing general remarks in view, it is an object of the present invention to provide a crossbar structure for cooperation with walls of a cargo stowage space provided with openings therein, characterized by its sturdy construction, ease of operation, durability, ease of manufacture, complete adjustability longitudinally of the stowage space, and its extreme simplicity.

It is a feature of the present invention to provide a crossbar structure having supporting elements pivoted adjacent the ends of the crossbar and movable between the supporting positions in which the supporting elements extend substantially horizontally beyond the ends of the crossbar and retracted positions in which the elements do not extend substantially beyond the ends of the crossbar. It is a further feature of the present invention to provide a crossbar having supporting elements at its opposite ends which provide for lateral adjustment between the crossbar and the supporting elements. It is a further feature of the present invention to provide a crossbar having supporting elements at its opposite ends pivoted thereto and provided with abutments engageable when the supporting elements are swung to outwardly extending supporting position, whereby the weight of the crossbar or any structure supported thereby is sustained by the abutments rather than by the pivot support of the supporting elements. It is a further feature of the present invention to provide a crossbar having supporting elements pivoted adjacent opposite ends thereof in which the supporting elements are transversely adjustable with respect to the bar when the supporting elements are swung out of supporting position and in which means are provided for preventing such transverse relative adjustment between the supporting elements and the crossbar when the supporting elements are swung outwardly to supporting position. Other objects and features of the invention will become apparent as the description proceeds, especially when taken in conjunction with the accompanying drawings, wherein:

Figure 1 is a fragmentary elevation of a portion of a side wall of a cargo stowage space;

Figure 4 is a section on the line 4—4 of Figure 2;

Figure 6 is a fragmentary side elevation of a crossbar structure showing the supporting element swung to retracted position;

Figure 7 is a diagrammatic figure illustrating the amount of adjustment provided between the crossbar and its supporting elements as compared to the transverse spacing between adjacent vertical rows of openings in the side walls of the cargo stowage space;

Figure 8 is a fragmentary plan view showing a modified design of supporting element; and Figure 9 is a section on line 9—9, Figure 5.

Figure 2:
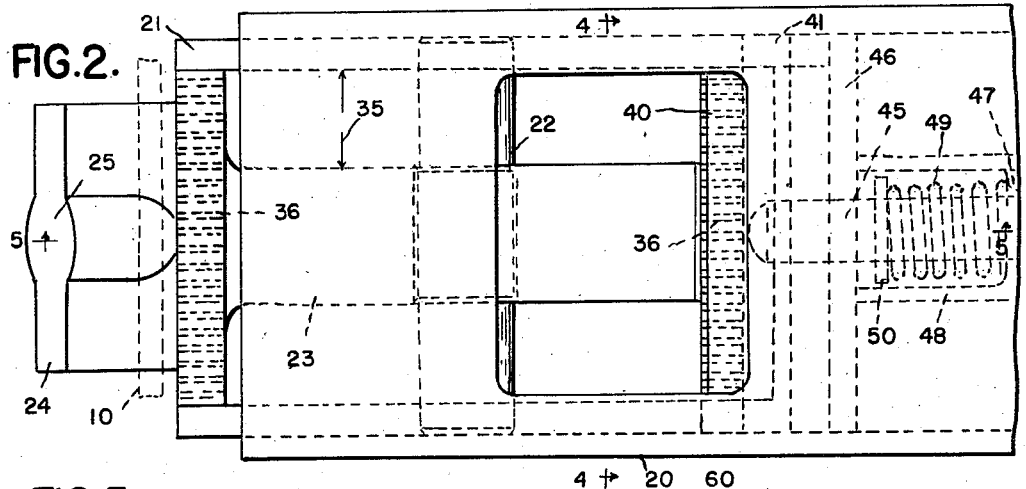
Figure 2 is a fragmentary plan view of one end of a crossbar structure.
Figure 5:
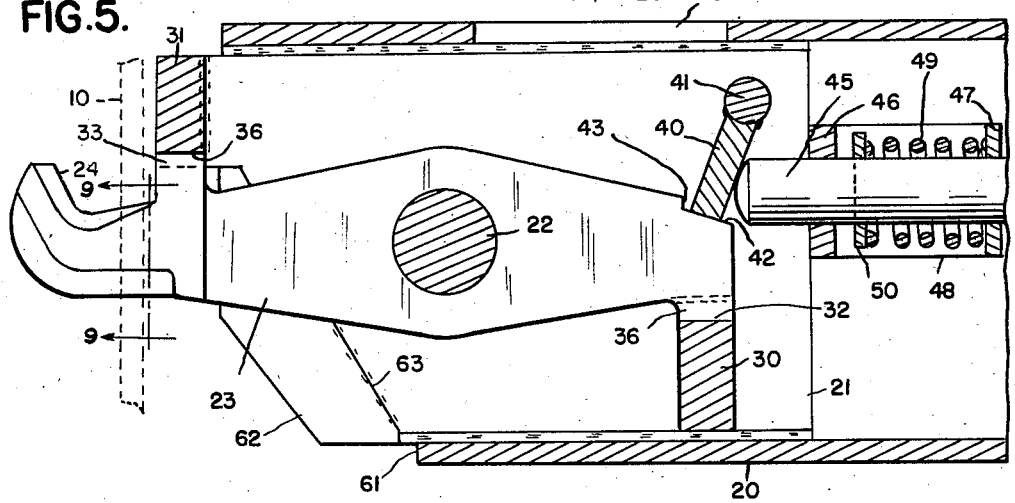
Figure 5 is a vertical section along the line 5—5 of Figure 2.

Referring first to Figure 1, there is indicated a portion of a wall 10 having a plurality of openings 11 therein, each opening comprising a horizontally elongated slit 12 having a centrally enlarged substantially circular portion 13. These openings are arranged in horizontal rows 14 and vertical rows 15, the horizontal spacing between adjacent rows being indicated by the numeral 16. It will be appreciated that the cargo stowage space is provided with pairs of opposed walls 10 and that the openings 11 are provided in registering pairs throughout the extent of the walls 10.

The crossbar structure comprises a crossbar 20 which as illustrated is in the form of a tubular member of substantially square cross section. It will be appreciated, however, that the shape of the crossbar member may be varied as desired and it may be, for example, in the form of an I-shaped beam, a circular pipe, or a solid member.

In accordance with the present invention supporting structure is provided adjacent both ends of the beam 20 and in the preferred form of the invention the supporting structure at opposite ends of the beam is identical. However, it will be appreciated that if desired a fixed supporting element may be provided at one end of the beam and the movable supporting element illustrated herein may be provided at the other end of the beam.

In order to simplify and facilitate the manufacture of the supporting structure it has been designed so that the assembly making up the supporting structure may be fabricated separately and introduced into the open end of the beam as a final operation. The supporting structure is adapted to be welded into the open end of the beam so that it becomes effectively an integral structure therewith.

The supporting structure comprises side plates 21 between which extends a horizontal pivot pin 22 upon which an elongated supporting element 23 is mounted to swing and slide. The supporting element 23 has an upwardly turned hook-shaped portion 24 whose cross sectional shape is such that it may enter into a selected opening 11 in the side wall 10 of the cargo stowage space, and it has a centrally thickened portion 25 adapted to cooperate with the enlarged central portion 13 of the opening 11. It will be appreciated that due to the matching shapes of the opening 11 and the hook portion 24, the supporting element will be substantially rigidly retained in the opening when it is in its outwardly extending supporting position.

Crossbars of this type may be employed in a variety of manners. For example, they may be placed up against the side of an object in order to prevent its longitudinal shifting. On the other hand, a plurality of such crossbars may be employed to provide a horizontal partition or floor extending across the cargo stowage space, in which case the crossbars may be subjected to a relatively heavy loading in use. In order to prevent damage to the pivot pin 22 there are provided abutment means adapted to sustain the weight of the cross bar or any structure carried thereby. This abutment means takes the form of a pair of relatively thick blocks 30 and 31 extending between the side plates 21 and welded thereto at their ends. The supporting element 23 is shaped to provide abutment shoulders 32 and 33 which cooperate respectively with the blocks 30 and 31. It will be apparent that when the hook portion 24 of the supporting element 23 is received in an opening 11 in the wall 10, the weight of the crossbar 20 or any structure supported thereby will be sustained by the abutting engagement between the block 30 and the shoulder 32 on the one hand and the block 31 and the shoulder 33 on the other hand. For this reason there is no substantial loading of the pivot pin 22 with resultant damage thereto.

Figure 3:
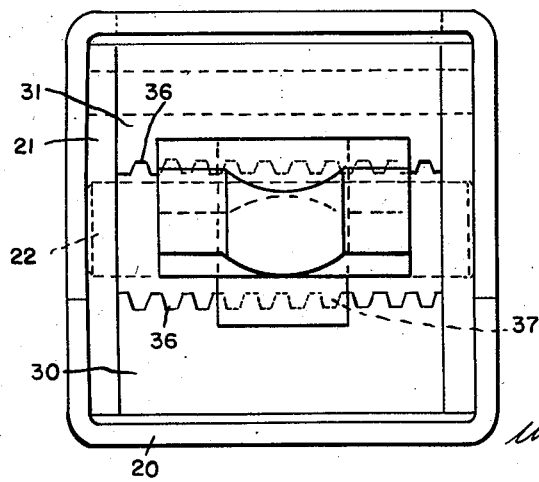
Figure 3 is an end elevation of the crossbar structure shown in Figure 2.

As best seen in Figure 2, the portion of the supporting element 23 which surrounds the pivot pin 22 has substantial side clearance as indicated by the arrow 35 with the result that the supporting element 23 may be moved transversely along the pivot pin 22 until the supporting element engages one or the other of the plates 21. In order to prevent accidental movement of the supporting element 23 relative to the crossbar 20, the following structure is provided. As best seen in Figure 3, the blocks 30 and 31 are provided with teeth 36. In like manner, the shoulders 32 and 33 on the supporting element 23 are provided with similar teeth 37. Engagement between the teeth 36 of the blocks 30 and 31 and the teeth 37 of the shoulder 32 or 33 will prevent lateral movement of the supporting element 23 with respect to the crossbar 20 whenever the supporting element is in its horizontally extending supporting position. However, when it is desired to effect adjustment of the crossbar 20 so as to bring it into engagement with an article which it is to support it is necessary only to lift the crossbar 20 an amount sufficient to cause the cooperating teeth 36 and 37 to clear, at which time the crossbar may be moved bodily with respect to the supporting elements which are at this time rigidly sustained in the openings in the side walls.

In order to prevent accidental disengagement between the teeth 36 and 37 a latch element is provided which takes the form of a strip 40 extending completely across the space between the plates 21 and which is pivoted therebetween by means of a pivoted support 41 journaled in suitable openings in the side plates 21. The inner upper end of the supporting element 23 is provided with a cut out portion providing a surface 42 against which the strip 40 may engage, and a shoulder 43 which prevents movement of the strip 40 beyond its effective position. A spring pressed pin 45 is provided at the rear of the strip 40 and having a rounded forward portion engaging the strip 40 and biasing the same into its latched position. The pin 45 passes through suitable openings in supporting plates 46 and 47 which are interconnected by side plates 48. Spring 49 surrounds the pin 45 and bears against the back plate 47. Adjacent the forward end of the pin 45 is a collar 50 against which the spring 49 bears. The collar 50 also is effective to limit forward movement of the pin 45 when the strip 40 is out of engagement with the supporting element 23 so that the strip 40 will never be biased beyond a position in which it may be returned to latching position by downward movement of the inner end of the supporting element 23.

As best illustrated in Figure 6, there is an opening 60 provided in the upper surface of the crossbar 20 which permits upward swinging of the inner end of the supporting element 23 therethrough. The bottom of the crossbar is cut away at its end as indicated at 61 to permit downward swinging of the supporting element 63 about its pivot support. The lower corners of the sides of the crossbar are cut away as indicated at 62 and the side plates 21 previously referred to are cut away at their outer lower corners as indicated at 63, to permit lateral adjustment of element 23. Accordingly the supporting element 23 may be swung to a retracted position in which it does not extend beyond the fixed crossbar structure or more specifically beyond the end of the block 31. Accordingly the fixed crossbar structure including the blocks 31 at its ends may be of a length substantially equal to the spacing of the side walls 10. In practice the crossbar structure may be only about an eighth of an inch less than the spacing between the walls.

As best seen in Figure 6, the crossbar may be assembled with the walls by bringing it into position adjacent the openings 11 which are to support it but spaced slightly above the openings. At this time the supporting elements 23 will be swung to their retracted position substantially as shown in this figure. The crossbar 20 may then be lowered while at the same time the supporting elements 23 are swung outwardly so that their upwardly hooked outer ends are caused to enter into the appropriate openings 11 in the side walls 10. If it is desired to effect a slight lateral adjustment of the crossbar with respect to the pair of openings in which it is supported this may be done by bodily moving the crossbar transversely before the locking teeth 37 on the abutments of the supporting element 23 engage the teeth 36 of the blocks 30 and 31 respectively. When such lateral adjustment has been completed the crossbar may be lowered to its lowermost position, at which time engagement between the teeth 36 and 37 prevents inadvertent relative shifting. At this time, the hook portion 24 extends laterally beyond an edge of the opening 11, and thus prevents accidental pulling out of the support element 23 from the opening 11, as might otherwise occur due to weaving or bulging of the walls 10. Latch strip 40 prevents rocking of the support element 23 relative to the bar. At the same time the engagement between the abutments on the supporting element and the blocks provided at opposite sides of the pivot pin 22 will sustain the weight of the crossbar 20 or any structure supported thereon.

Reference was previously made to the fact that the lateral adjustment provided between the supporting elements of the crossbar was sufficient so that the crossbar could be positioned in any desired transverse position of adjustment. This arrangement is clearly illustrated in Figure 7, in which the crossbar 20 is shown in section at one extreme position of adjustment while it is being supported from the opening 11. The other extreme position of adjustment is indicated by the broken line outline designated 20'. From a consideration of the amount of adjustment illustrated and the space 16 between adjacent vertical rows of openings it will be apparent that the right hand side, for example, of the crossbar 20 as illustrated in Figure 7 could be in the position shown in broken lines when the supporting elements are engaged in an opening in the next adjacent vertical row to the right.

Referring now to Figure 8, there is illustrated a somewhat different modification of the supporting element 70 which differs from that shown in the previously described modification in that its outer end is provided with a pair of upwardly curved hooked portions 71 and 72 which are spaced apart by the exact amount of spacing of adjacent pairs of openings 11 so that the hooked portions 71 and 72 engage the adjacent openings simultaneously. This arrangement provides for increased stability of the crossbar structure as well as distributing the weight sustained thereby to a pair of openings rather than concentrating the weight on a single opening. The structure of the supporting element shown in Figure 8 is otherwise identical with that of the supporting elements 23 previously described in that the same degree of transverse adjustment is provided, the load sustaining and locking abutments are provided and the spring pressed latch means for retaining the supporting elements in supporting position is also provided.

While there has been illustrated and described a preferred form of crossbar and supporting structure therefor together with a slight modification of one of the supporting elements, it will be appreciated that the specific illustration and description has been given merely in order to enable those skilled in the art to practice the invention the scope of which is indicated by the appended claims.

What we claim as our invention is:

1. Crossbar structure adapted to be rigidly positioned between selected openings provided in spaced apart walls which comprises an elongated bar, a supporting element at one end of said bar adapted to enter and shaped to be firmly retained in one of the aligned openings in said walls, said supporting element being pivotally movable between a clearance position in which it does not extend substantially beyond the end of said bar, and a supporting position in which it extends a substantial distance beyond the end of said bar, whereby said bar may be of a length substantially equal to the spacing between said walls while providing for ready release and engagement of said supporting element in the opening in said wall, said supporting element having portions extending in opposite directions from its pivot support, abutments carried by said bar at opposite sides of said pivot support, said element being shaped to engage both of said abutments simultaneously when pivoted to supporting position.

2. Crossbar structure adapted to be rigidly positioned between selected openings provided in spaced apart walls which comprises an elongated bar, supporting elements at opposite ends of said bar adapted to enter and shaped to be firmly retained in said openings, pivot means on said bar on which said supporting elements are movable between clearance positions in which they do not extend substantially beyond the ends of said bar, and locking positions in which they extend a substantial distance beyond the ends of said bar, whereby said bar may be of a length substantially equal to the spacing between said walls, while providing for ready release and engagement of said supporting elements in the openings in said walls, and means for providing a relative adjustment between said bar and said supporting elements transversely of said bar to position said bar at different positions with respect to the pair of openings in which it is supported, said supporting elements having portions extending in opposite directions from the pivot means, toothed abutments carried by said bar at opposite sides of each of said pivot supports, said supporting elements each having corresponding toothed portions shaped to engage both of said abutments simultaneously in any position of transverse adjustment when swung to supporting positions.

3. Supporting structure for a stowage space comprising in combination a pair of spaced walls each having vertical tiers of openings, said tiers being spaced apart by a predetermined distance, a crossbar structure comprising a bar having supporting elements at its ends engageable in aligned openings in said walls, said bar and supporting elements being relatively transversely adjustable by an amount substantially equal to the horizontal spacing of adjacent vertical tiers of openings whereby said bar may be caused to occupy any desired position transversely of said stowage space, said supporting elements being pivoted to said bar for movement into and out of supporting position in openings in said walls, and locking means preventing relative transverse movement of said bar and elements when said elements are in supporting position, said locking means comprising toothed abutments carried by said bar and a cooperating toothed portion on each of said elements engageable with said abutments only when said elements are swung to supporting position.

4. Crossbar structure adapted to be rigidly positioned between a pair of aligned openings provided in spaced apart walls which comprises an elongated bar having open ends, a support assembly insertable as a unit into an open end of said bar for permanent attachment thereto as by welding, said assembly comprising a pair of spaced apart side plates, a pair of cross pieces in the form of heavy abutment members connecting said plates, a pivot pin spanning said side plates between said abutment members, and a supporting element pivotally carried by said pin and adapted, when said assembly is secured in the open end of said bar, to be swung outwardly to a supporting position beyond the end of said bar, said element having shoulders engageable with said abutment members when said element is in supporting position.

5. Crossbar structure adapted to be rigidly positioned between a pair of aligned openings provided in spaced apart walls which comprises an elongated bar having open ends, a pair of side plates received in the open end of said bar, a pair of abutment members interconnecting said plates at points spaced along said bar, a supporting element pivoted intermediate its ends between said abutment members, and having shoulders thereon adapted to engage said members when said element is swung to supporting position.

6. Crossbar structure adapted to be rigidly positioned between a pair of aligned openings provided in spaced apart walls which comprises an elongated bar having open ends, a pair of side plates received in the open ends of said bar, a pair of toothed abutment members interconnecting said plates at points spaced along said bar, a supporting element pivoted intermediate its ends between said abutment members, and having shoulders thereon adapted to engage said members when said element is swung to supporting position, said supporting element being transversely adjustable along said pin, the shoulders of said element being toothed for interlocking engagement with said abutments.

7. A crossbar structure adapted to be rigidly positioned between selected openings provided in spaced apart walls which comprises an elongated bar having an open end, a pivot pin extending transversely across said open end, a supporting element pivotally mounted intermediate its ends in the open end of said bar on said pin and having a relatively wide, upwardly curved hook portion at its outer end, said element being transversely slidable on said pin, the lower end walls of the open end of said bar being cut away to provide clearance for the relatively wide hook portion of the supporting element in any position of adjustment thereof relative to said bar, fixed abutments on the bar engageable by portions of said supporting element when said element is swung to supporting position, the top portion of the open end of the crossbar having an opening therein providing clearance for upward swinging of the inner end of said element when said element is swung to retracted position.

8. Crossbar structure adapted to be rigidly positioned between selected openings provided in spaced apart walls which comprises an elongated bar having an open end, a pivot pin extending transversely across said open end, a supporting element pivotally mounted intermediate its ends in the open end of said bar on said pin and having a relatively wide, upwardly curved hook portion at its outer end, said element being transversely slidable on said pin, the lower end walls of the open end of said bar being cut away to provide clearance for the relatively wide hook portion of the supporting element in any position of adjustment thereof relative to said bar, fixed abutments on the bar engageable by portions of said supporting element when said element is swung to supporting position, the top portion of the open end of the crossbar having an opening therein providing clearance for upward swinging of the inner end of said element when said element is swung to retracted position, and manually releasable latch means adapted to latch said support element in supporting position, the opening in the top portion of the open end of said crossbar affording access to said latch means.

9. Crossbar structure adapted to be rigidly positioned between selected openings provided in spaced apart walls which comprises an elongated bar having an open end, a supporting element in an open end of said bar, said element having a support portion movable to a supporting position beyond the end of said bar for reception in an opening in one of the spaced apart walls, means in the open end of said bar movably mounting said element, a pair of abutments in the open end of said bar, one of said abutments overlying said element and ajacent the end of said bar, the other of said abutments underlying said element and being located inwardly from the end of said bar, and shoulders on said supporting element engageable with said abutments when the support portion of said element is in supporting position.

10. Crossbar structure adapted to be rigidly positioned between selected openings provided in spaced apart walls which comprises an elongated bar having an open end, a supporting element in an open end of said bar, said element being movable transversely of said bar and having a support portion movable to a supporting position beyond the end of said bar for reception in an opening in one of the spaced apart walls, an abutment in the open end of said bar, and a shoulder on said supporting element engageable with said abutment only when the support portion of said element is in supporting position, said shoulder and abutment having toothed engaging surfaces to prevent inadvertent relative transverse movement therebetween while said support element is in supporting position.

11. Crossbar structure adapted to be rigidly positioned between selected openings provided in spaced apart walls which comprises an elongated bar having an open end, a supporting element pivotally mounted intermediate its ends in an open end of said bar, said element being movable transversely of said bar and having a support portion movable to a supporting position beyond the end of said bar for reception in an opening in one of the spaced apart walls, a pair of abutments in the open end of said bar, one of said abutments overlying said element and adjacent the end of said bar, the other of said abutments underlying said element and being located inwardly from the end of said bar, and shoulders on said supporting element at opposite sides of its pivot support engageable with said abutments when the support portion of said element is in supporting position, said shoulders and abutments having toothed engaging surfaces to prevent inadvertent relative transverse movement therebetween while said support element is in supporting position.

12. Crossbar structure adapted to be positioned between selected openings provided in spaced apart walls, comprising an elongated bar, pivot pins extending transversely of said elongated bar adjacent opposite ends thereof, elongated supporting elements extending longitudinally of said elongated bar and mounted intermediate their ends to swing about and to slide lengthwise of said pins, the outer free ends of said supporting elements being movable to a supporting position beyond the ends of said elongated bar for reception in the selected openings in said spaced apart walls, upper and lower abutments for said supporting elements carried by said elongated bar, the upper abutments being located outwardly beyond said pivot pins and adapted to limit upward swinging movement of the outer free ends of said supporting elements, the lower abutments being located inwardly beyond said pivot pins and adapted to limit downward swinging movement of the inner ends of said supporting elements, cooperating means on said abutments and supporting elements operable to limit sliding movement of said supporting elements on said pivot pins, and means for holding said supporting elements in engagement with both said upper and lower abutments simultaneously, including pivoted latch elements carried by said elongated bar and engageable with said supporting elements, and spring pressed elements for holding said latch elements in latching engagement with said supporting elements.

13. Crossbar structure adapted to be positioned between selected openings provided in spaced apart walls, comprising an elongated bar, pivot pins extending transversely of said elongated bar adjacent opposite ends thereof, elongated supporting elements extending longitudinally of said elongated bar and mounted intermediate their ends to swing about and to slide lengthwise of said pins, the outer free ends of said supporting elements being movable to a supporting position beyond the ends of said elongated bar for reception in the selected openings in said spaced apart walls, upper and lower abutments for said supporting elements carried by said elongated bar, the upper abutments being located outwardly beyond said pivot pins and adapted to limit upward swinging movement of the outer free ends of said supporting elements, the lower abutments being located inwardly beyond said pivot pins and adapted to limit downward swinging movement of the inner ends of said supporting elements, and means operable to hold said supporting elements against sliding lengthwise of said pivot pins when said supporting elements are in engagement with said abutments, including cooperating interlocking elements on said supporting elements and abutments.

14. Crossbar structure adapted to be positioned between selected openings provided in spaced apart walls, comprising an elongated bar, pivot pins extending transversely of said elongated bar adjacent opposite ends thereof, elongated supporting elements extending longitudinally of said elongated bar and mounted intermediate their ends to swing about and to slide lengthwise of said pins, the outer free ends of said supporting elements being movable to a supporting position beyond the ends of said elongated bar for reception in the selected openings in said spaced apart walls, upper and lower abutments for said supporting elements carried by said elongated bar, the upper abutments being located outwardly beyond said pivot pins and adapted to limit upward swinging movement of the outer free ends of said supporting elements, the lower abutments being located inwardly beyond said pivot pins and adapted to limit downward swinging movement of the inner ends of said supporting elements, cooperating means on said abutments and supporting elements operable to limit sliding movement of said supporting elements on said pivot pins, and latch members on said bar movable automatically into latching engagement with said supporting elements upon movement of said supporting elements into supporting position for holding said supporting elements in engagement with both said upper and lower abutments simultaneously.

15. Crossbar structure adapted to be positioned between selected openings provided in spaced apart walls, comprising an elongated bar, pivot pins extending transversely of said elongated bar adjacent opposite ends thereof, elongated supporting elements extending longitudinally of said elongated bar and mounted intermediate their ends to swing about said pins, the outer free ends of said supporting elements being movable to a supporting position beyond the ends of said elongated bar for reception in the selected openings in said spaced apart walls, upper and lower abutments for said supporting elements carried by said elongated bar, the upper abutments being located outwardly beyond said pivot pins and adapted to limit upward swinging movement of the outer free ends of said supporting elements, the lower abutments being located inwardly beyond said pivot pins and adapted to limit downward swinging movement of the inner ends of said supporting elements, and means for holding said supporting elements in engagement with both said upper and lower abutments simultaneously, including pivoted latch elements carried by said elongated bar and engageable with said supporting elements, and spring pressed elements for holding said latch elements in latch engagement with said supporting elements.

16. Crossbar structure adapted to be anchored within a pair of aligned openings provided in spaced apart walls, including an elongated bar, a support element pivoted to said bar adjacent an end thereof for pivotal movement between a supporting position and a retracted position relative to an opening in one of said walls, said pivoted support element having a hook shaped portion adapted when said element is in supporting position to project through and extend laterally beyond an edge of an opening in one of said walls, and a latch carried by said bar and engageable with said pivoted element for retaining said bar and element in supporting position.

17. Crossbar structure adapted to be anchored within a pair of aligned openings provided in spaced apart walls, including an elongated bar, a support element pivoted to said bar adjacent an end thereof for pivotal movement between a supporting position and a retracted position relative to an opening in one of said walls, said pivoted support element having a hook shaped end portion adapted when said element is in supporting position to project through and extend laterally beyond an edge of an opening in one of said walls, and a spring pressed latch carried by said bar and engageable with said pivoted element for retaining said bar and element in supporting position.

18. An elongated cargo brace adapted to extend between and be detachably secured in selected openings in opposed walls of a vehicle, including an elongated bar provided at each end thereof with a pivoted element having a hooked shaped end portion adapted to be inserted in an opening in one of said walls to anchor and support said bar relative to said walls, and provided adjacent each pivoted element with a pivoted latch for latching engagement with the pivoted element adjacent thereto to hold said bar in anchored and supported relation with respect to said opposed walls.

19. An elongated cargo brace adapted to extend between and be detachably secured in selected openings in opposed walls of a vehicle, including an elongated bar provided at each end thereof with means adapted to be inserted in an opening in one of said walls to anchor and support said bar relative to said walls, the means at one end of said bar being an element pivoted to said bar and having a hooked shaped portion adapted to project through and extend laterally beyond an edge of an opening in one of said walls, and a movable latch carried by said bar for latching engagement with said pivoted element to hold said bar in anchored and supported relation with respect to said opposed walls.

20. An elongated cargo brace adapted to extend between and be detachably secured in selected openings in opposed walls of a vehicle, including an elongated bar provided at each end thereof with a pivoted element having a hook shaped portion adapted to be inserted in an opening in one of said walls and to extend laterally beyond an edge of the opening to anchor and support the bar relative to said walls, and means cooperating with said pivoted element to hold said bar in anchored and supported relation with respect to said opposed walls, including spring biased movable latches carried by said bar adjacent the ends thereof and engageable respectively with said pivoted elements.

21. An elongated cargo brace adapted to extend between and be detachably secured in selected openings in opposed walls of a vehicle, including an elongated bar provided at each end thereof with means adapted to be inserted in an opening in one of said walls to anchor and support said bar relative to said walls, the means at one end of said bar being an element movably mounted on said bar and having a hook shaped end portion adapted to project through and extend laterally beyond an edge of an opening in one of said walls, and a latch movably carried by said bar for latching engagement with said movably mounted element to hold said bar in anchored and supported relation with respect to said opposed walls.

22. An elongated cargo brace adapted to extend between and be detachably secured in selected openings in opposed walls of a vehicle, including an elongated bar provided at each end thereof with means adapted to be inserted in an opening in one of said walls to anchor and support said bar relative to said walls, the means at one end of said bar consisting of a single element movably mounted on said bar and having a portion shaped to project through and extend laterally beyond an edge of an opening in one of said walls, and a latch movably carried by said bar for latching engagement with said movably mounted element to hold said bar in anchored and supported relation with respect to said opposed walls.

23. As an article of manufacture, an elongated freight bracing bar to extend across, between, and be secured in selected perforations in, opposite upright side surfaces of a chamber such as a freight car, said bar having adjacent each end thereof a perforation-entering and normally anti-pull-out member which, in its engaged and operative position, has a laterally extending portion interengaging behind a said surface, at least one of said members being mounted on said bar to at least swing relative to the bar in a plane substantially parallel and adjacent to the longitudinal axis of the bar to permit insertion and removal of both said members, and a movable latch to selectively secure said swingable members to said bar to hold said swingable member in its operative position.

24. The structure of claim 23 in which each said perforation-entering member is of a size and proportion to fill said perforations to such extent as to substantially prevent lateral and vertical displacements relative thereto.

25. The structure of claim 23 in which said swingable member is so mounted that in its said operative position it has a portion engaging an adjacent end portion of the bar, said engagement cooperating in providing a limit to said swinging movement.

26. The organization of claim 23 in which, when said bar is in its said operative position, said swinging is in a substantially vertical plane and said bar includes co-engageable surfaces to limit upward swinging of said member beyond its said operative position.

27. The organization of claim 23 in which, in said operative position of the bar, said swinging is in a substantially vertical plane, and in which each said laterally extending portion is integral with its perforation-entering member and is upwardly directed when the bar is in its said operative position.

28. As an article of manufacture, an elongated freight bracing bar to be secured in selected positions in perforations in opposite upright wall surfaces of a chamber such as a freight car, said bar having perforation-entering heads adjacent its ends, each of said heads including a perforation-entering portion which, in engaged position, is upwardly directed and interlocks behind a said surface to prevent accidental removal of the corresponding end of the bar, at least one of said heads being mounted for movement having at least a component of swinging motion in a plane substantially parallel and adjacent to the longitudinal axis of said bar to permit insertion and removal thereof, and a latch movably mounted on said bar to selectively engage said swingable head to secure it in operative position.

29. As an article of manufacture, a freight bracing cross bar for use in a freight car having bar securing means such as vertical steel plate linings carried by the car side walls and having perforations therethrough, said bar being adapted to extend horizontally across the car and to be removably secured in and between selected opposite perforations; said bar having an elongated body portion having a perforation-entering, male head at each end thereof; at least one of said heads being mounted to swing relative to said body portion in a plane which in operative position of said bar is substantially vertical and substantially parallel and adjacent to the longitudinal axis of said bar, between an operative perforation-entering position and a lower hang-down insertion position; stop means to prevent upward swinging of said swingable head past its operative position; each male head further comprising an accidental pull-out preventing, perforation-entering outer end portion which is upwardly extending in the operative engaged position of the bar and has an inner upwardly extending shoulder surface to substantially engage said wall linings on their outer faces above the engaged perforations to prevent withdrawal of said perforation-entering outer end portion without at least swinging motion of the corresponding head relative to said lining; and a manually operable latch adjacent the corresponding end of the bar and acting between said swingable head and said body portion to selectively prevent downward swinging motion of said swingably mounted head from its operative position.

30. The organization of claim 29 in which said latch is swingably mounted on said body portion and acts directly between said swingable head and body portion.

31. The structure of claim 29 in which said elongated body portion comprises a rectangular tubular metal section uniform from end to end thereof and in which said heads are mounted in the open ends of said tubular section.

32. Crossbar structure adapted to be anchored between a pair of aligned openings provided in spaced apart walls, including an elongated bar, a support element pivoted to said bar adjacent an end thereof for pivotal movement between a supporting position and a retracted position relative to an opening in one of said walls, said pivoted support element having a projecting portion adapted when said element is in supporting position to be located at the opposite side of the adjacent one of said spaced apart walls from said bar and to extend laterally beyond an edge portion of said opening, and a latch carried by said bar and engageable with said pivoted element for retaining said bar and element in supporting position.

33. Crossbar structure adapted to be anchored between a pair of aligned openings provided in spaced apart walls, including an elongated bar, a support element pivoted to said bar adjacent an end thereof for pivotal movement between a supporting position and a retracted position relative to an opening in one of said walls, said pivoted support element having a projecting portion adapted when said element is in supporting position to be located at the opposite side of the adjacent one of said spaced apart walls from said bar and to extend laterally beyond an edge portion of said opening, and a spring pressed latch carried by said bar and engageable with said pivoted element for retaining said bar and element in supporting position.

GERALD D. STOUGH.
RICHARD W. FOX.

REFERENCES CITED

The following references are of record in the file of this patent:

UNITED STATES PATENTS

| Number | Name | Date |
|---|---|---|
| 2,030,773 | Thomas | Feb. 11, 1936 |
| 2,056,704 | Anderson | Oct. 6, 1936 |
| 2,091,869 | McCurdy | Aug. 31, 1937 |
| 2,294,795 | Moses | Sept. 1, 1942 |
| 2,309,606 | Nystrom | Jan. 26, 1943 |
| 2,354,861 | Hermann | Aug. 1, 1944 |
| 2,425,875 | Hermann | Aug. 19, 1947 |
| 2,440,437 | Fahland | Apr. 27, 1948 |
| 2,497,683 | Nampa et al. | Feb. 14, 1950 |